United States Patent
Ji et al.

(10) Patent No.: US 11,643,343 B2
(45) Date of Patent: *May 9, 2023

(54) BALLAST WATER TREATMENT SYSTEM AND METHOD

(71) Applicant: HANLAIMS CO., LTD, Busan (KR)

(72) Inventors: Suk-joon Ji, Busan (KR); Young-gu Kim, Busan (KR); Hoi-young Yang, Busan (KR); Chang-kook Kim, Busan (KR); Jong-min Chung, Busan (KR); Chung-il Kim, Busan (KR); Jun-tae Lee, Busan (KR); Kyoung-yup Kim, Busan (KR)

(73) Assignee: HANLAIMS CO., LTD, Busan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,651

(22) Filed: Nov. 4, 2021

(65) Prior Publication Data

US 2022/0055924 A1    Feb. 24, 2022

Related U.S. Application Data

(63) Continuation of application No. 16/604,716, filed as application No. PCT/KR2018/004064 on Apr. 6, 2018, now Pat. No. 11,192,806.

(30) Foreign Application Priority Data

Apr. 12, 2017    (KR) .................. 10-2017-0047494

(51) Int. Cl.
*C02F 1/461*    (2023.01)
*B01D 35/02*    (2006.01)
(Continued)

(52) U.S. Cl.
CPC .......... *C02F 1/46104* (2013.01); *B01D 35/02* (2013.01); *B63J 4/002* (2013.01);
(Continued)

(58) Field of Classification Search
None
See application file for complete search history.

(56) References Cited

U.S. PATENT DOCUMENTS

| 11,192,806 | B2 * | 12/2021 | Ji ........................... C02F 1/004 |
| 2008/0000775 | A1 | 1/2008 | Childers et al. |
| 2008/0277274 | A1 | 11/2008 | Kim et al. |

FOREIGN PATENT DOCUMENTS

| JP | 2010207795 A | 9/2010 |
| KR | 1020150076821 A | 7/2015 |

(Continued)

OTHER PUBLICATIONS

International Search Report (in English and Korean) and Written Opinion (in Korean) issued in PCT/KR2018/004064, dated Jul. 19, 2018; ISA/KR.

*Primary Examiner* — Richard C Gurtowski
(74) *Attorney, Agent, or Firm* — Harness, Dickey & Pierce, P.L.C.

(57) ABSTRACT

A water treatment system and a ballast water treatment method. A ballast water treatment system according to an embodiment of the present invention comprises: a first ballast water supply pipe for receiving a supply of ballast water from a first sea chest positioned in a non-explosion-proof area of a ship; an electrolytic bath for electrolyzing the ballast water supplied from the first ballast water supply pipe; a second ballast water supply pipe for receiving a supply of ballast water from a second sea chest, which is positioned in an explosion-proof area of the ship, and supplying the ballast water to a ballast tank of the ship; a filter provided to the second ballast water supply pipe so as (Continued)

to filter the ballast water passing through the second ballast water supply pipe; and a third ballast water supply pipe connected to the second ballast water supply pipe so as to supply the ballast water, which has been electrolyzed from the electrolytic bath, to the ballast water which has passed through the filter.

17 Claims, 6 Drawing Sheets (51) Int. Cl.
| | |
|---|---|
| *B63J 4/00* | (2006.01) |
| *C02F 1/00* | (2023.01) |
| *C02F 1/467* | (2023.01) |
| *C02F 1/70* | (2023.01) |
| *C02F 103/00* | (2006.01) |

(52) U.S. Cl.
CPC ............ *C02F 1/004* (2013.01); *C02F 1/4672* (2013.01); *C02F 1/70* (2013.01); *C02F 2103/008* (2013.01); *C02F 2209/03* (2013.01); *C02F 2209/40* (2013.01); *C02F 2301/043* (2013.01); *C02F 2303/04* (2013.01)

(56) References Cited

FOREIGN PATENT DOCUMENTS

| KR | 1020150122004 A | 10/2015 |
|---|---|---|
| KR | 1020160112601 A | 9/2016 |
| KR | 1020160124688 A | 10/2016 |

\* cited by examiner

BALLAST WATER TREATMENT SYSTEM AND METHOD

CROSS-REFERENCE TO RELATED APPLICATIONS

This application is a continuation of U.S. application Ser. No. 16/604,716 filed Oct. 11, 2019, which is a 371 U.S. National Phase of International Application No. PCT/KR2018/004064, filed Apr. 6, 2018, which claims the benefit of Korean Patent Application No. 10-2017-0047494, filed Apr. 12, 2017. The entire disclosures of the above applications are incorporated herein by reference.

TECHNICAL FIELD

The present invention relates to a system for treating ballast water of a ship and a method of treating the ballast water.

BACKGROUND ART

Discussion

Today, ships are used as a means of transporting various cargoes in addition to being used as a means of transporting people. For stability and propulsion efficiency when no cargo is loaded on a ship, the ship employs a ballast tank system.

A ballast tank system provides a method of operating a ship by adjusting an amount of ballast water in a ballast tank such that the variation of the center of gravity of the ship according to whether cargo is loaded or unloaded is reduced to ensure safe sailing.

Generally, when a ship transports cargo, the cargo of the ship is unloaded at a port in which the cargo is unloaded. Thereafter, the ship is filled with ballast water at the port in which the cargo has been unloaded and returns. Thereafter, when new cargo is loaded on the ship, the ballast water is discarded at a port in which the cargo is loaded so that the cargo is loaded, and then the ship sets sail.

However, in such processes, the port in which the cargo is unloaded and the port in which the new cargo is loaded are different, and thus there may be a problem in that the ballast water obtained in an environment different from that of the loading port is discarded at the loading port.

That is, the ballast water may be used as a medium for spreading organisms or pathogens in a specific sea area to another sea area, and thus there may be a problem in that the environment of the loading port is destroyed when the ballast water which is obtained in the environment different from that of the loading port is discarded without any consideration.

Therefore, in order to address the above problems, when ballast water is discarded, the necessity of sterilization treatment on the ballast water to discard the ballast water has emerged.

SUMMARY OF THE INVENTION

The present invention is directed to providing a ballast water treatment system and a ballast water treatment method.

The present invention is not limited thereto, and other unmentioned objects will be clearly understood by those skilled in the art from the following descriptions.

Technical Solution

One aspect of the present invention provides a ballast water treatment system.

According to an embodiment of the present invention, the ballast water treatment system includes a first ballast water supply pipe configured to receive ballast water from a first sea chest positioned in a non-explosion-proof area of a ship, an electrolytic bath configured to electrolyze the ballast water supplied from the first ballast water supply pipe, a second ballast water supply pipe configured to receive ballast water from a second sea chest positioned in an explosion-proof area of the ship and supply the ballast water to a ballast tank of the ship, a filter provided in the second ballast water supply pipe so as to filter the ballast water passing through the second ballast water supply pipe, and a third ballast water supply pipe connected to the second ballast water supply pipe so as to supply the ballast water, which has been electrolyzed by the electrolytic bath, to the ballast water which has passed through the filter.

The ballast water treatment system may further include a strainer provided in the first ballast water supply pipe to filter the ballast water flowing through the first ballast water supply pipe.

The ballast water treatment system may further include pressure sensors provided in front of and behind the strainer.

An interval between electrodes of the electrolytic bath may range from 2 mm to 5 mm.

The ballast water treatment system may further include a first pump provided in the first ballast water supply pipe to supply the ballast water to the electrolytic bath and a second pump provided in the second ballast water supply pipe to supply the ballast water to the ballast tank.

The ballast water treatment system may further include a flow rate adjuster provided behind the first pump of the first ballast water supply pipe.

A diameter of the first ballast water supply pipe may be smaller than a diameter of the second ballast water supply pipe.

A capacity of the first pump may be smaller than a capacity of the second pump.

The ballast water treatment system may further include a total residual oxidant (TRO) sensor provided between a point of the second ballast water supply pipe, which is connected to the third ballast water supply pipe and the ballast tank to measure a concentration of an oxidant of the ballast water.

The ballast water treatment system may further include a first ballast water discharge pipe connected to the ballast tank, wherein one end portion of the first ballast water discharge pipe may be connected to the ballast tank in order to discharge the ballast water in the ballast tank to the outside during deballasting and the other end portion of the first ballast water discharge pipe may be connected to a front end portion of the second pump of the second ballast water supply pipe, a bypass pipe through which the ballast water supplied from the first ballast water discharge pipe may move and which is branched at a front end portion of the filter of the second ballast water supply pipe to be connected to a rear end portion of the filter, and a second ballast water discharge pipe disposed between a rear end portion of the TRO sensor of the second ballast water supply pipe and the ballast tank so as to discharge the ballast water, which is supplied from the bypass pipe, to the outside.

The ballast water treatment system may further include a reducing agent supply member configured to supply a reducing agent to the first ballast water discharge pipe, wherein the reducing agent supply member may mix reducing agents having different concentrations and the mixed reducing agent may be supplied to the first ballast water discharge pipe.

Another aspect of the present invention provides a ballast water treatment method.

The ballast water treatment method includes an electrolytic bath operation of receiving ballast water from a first sea chest of a ship and supplying the ballast water to an electrolytic bath through a first ballast water supply pipe, a main ballast water supply operation of receiving ballast water from a second sea chest of the ship and supplying the ballast water to a ballast tank of the ship through a second ballast water supply pipe, a filtration operation of filtering, by a filter, the ballast water passing through the second ballast water supply pipe, and an auxiliary ballast water supply operation of supplying the ballast water, which is electrolyzed by the electrolytic bath, to the ballast water which has passed through the filter.

The ballast water treatment method may further include a strainer operation of passing the ballast water through a strainer before the ballast water is introduced into the electrolytic bath from the first sea chest.

The ballast water treatment method may further include a pressure measurement operation of measuring pressure at each of a front end portion and a rear end portion of the strainer when the ballast water passes through the strainer.

The ballast water treatment method may further include a gas-liquid separation operation of separating gas, which is generated by the electrolytic bath, using a gas-liquid separator.

The ballast water treatment method may further include a neutralization operation of supplying a reducing agent to the ballast water discharged from the ballast tank to neutralize.

The ballast water treatment method may further include a concentration measurement operation of measuring a concentration of an oxidant of the ballast water introduced into the ballast tank or measuring a concentration of an oxidant of the ballast water discharged from the ballast tank.

The first sea chest may be positioned in a non-explosion-proof area of the ship, and the second sea chest may be positioned in an explosion-proof area of the ship.

According to an embodiment of the present invention, when ballast water is introduced into a ship, marine microorganisms in the ballast water can be sterilized, and thus environmental pollution of a loading port due to the ballast water can be minimized.

In addition, according to an embodiment of the present invention, when ballast water in a ballast tank of a ship is discharged to the outside, the ballast water can be discharged to the outside after neutralizing an oxidant inside the ballast water, and thus environmental pollution of a loading port can be minimized.

In addition, according to an embodiment of the present invention, an electrolytic bath that performs electrolysis can be provided in a non-explosion-proof area, and thus a risk of explosion can be minimized.

In addition, according to an embodiment of the present invention, an electrolytic bath, which is an electrical and electronic device, can be provided in a non-explosion-proof area, non-explosion-proof products can be used, and thus installation costs of the electrolytic bath can be minimized.

Effects of the present invention are not limited to the above-described effects and other unmentioned effects can be clearly understood by those skilled in the art according to this specification and the accompanying drawings.

DESCRIPTION OF THE PREFERRED EMBODIMENTS

Hereinafter, embodiments of the present invention will be described in more detail with reference to the accompanying drawings. The embodiments of the present invention may be embodied in many different forms and the scope of the present invention should not be construed as being limited to the following embodiments. The embodiments are provided in order to fully explain the invention for those skilled in the art. Therefore, a shape of elements in the drawings may be exaggerated for a more precise description. In addition, terms and words used in this specification and claims should not be interpreted as being limited to commonly used meanings or meanings in dictionaries and should be interpreted with meanings and concepts which are consistent with the technological scope of the invention based on the principle that the inventors have appropriately defined concepts of terms in order to describe the invention in the best way.

In the present invention, a ballast water treatment system 1 for treating ballast water which is introduced into or discharged from a ballast tank 40 of a ship is provided. The ballast water treatment system 1 may sterilize ballast water at a port and introduce the sterilized ballast water into the ballast tank 40. When the ballast water is discharged from the ballast tank 40, the ballast water treatment system 1 may neutralize the ballast water and discharge the neutralized ballast water to the outside.

For example, the ballast water may be seawater, brackish water, or fresh water. In the present invention, an example in which the ballast water is seawater will be described. However, the ballast water is not limited to the seawater.

Figure 1:
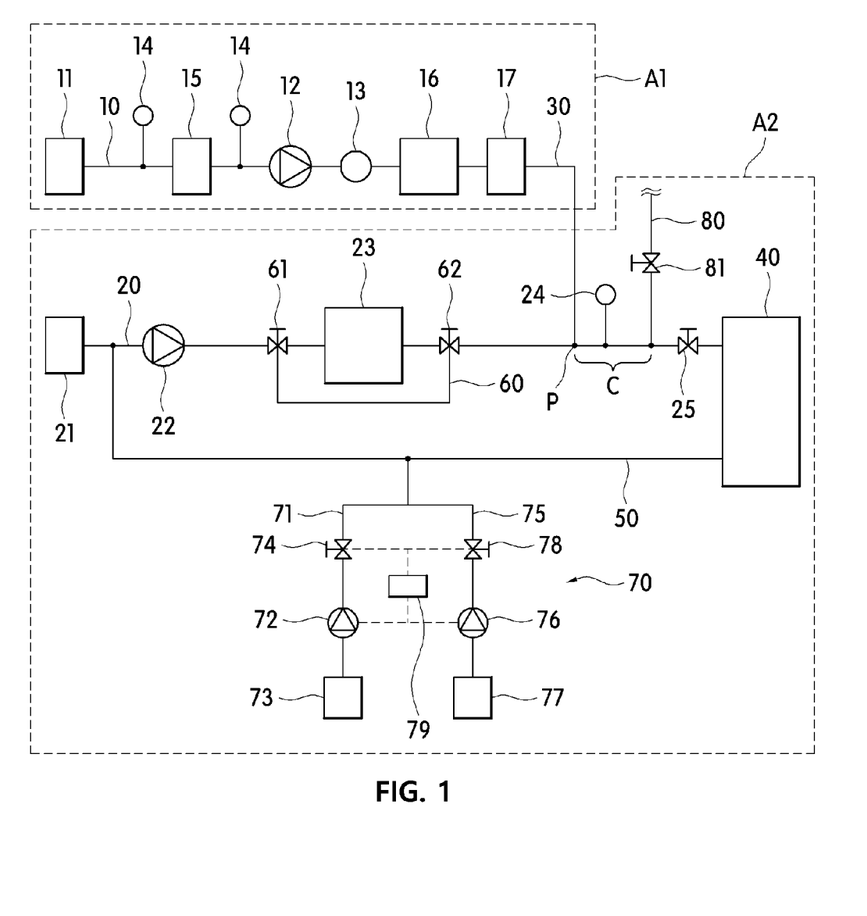
FIG. 1 is a schematic view illustrating a ballast water treatment system according to an embodiment of the present invention.
Figure 2:
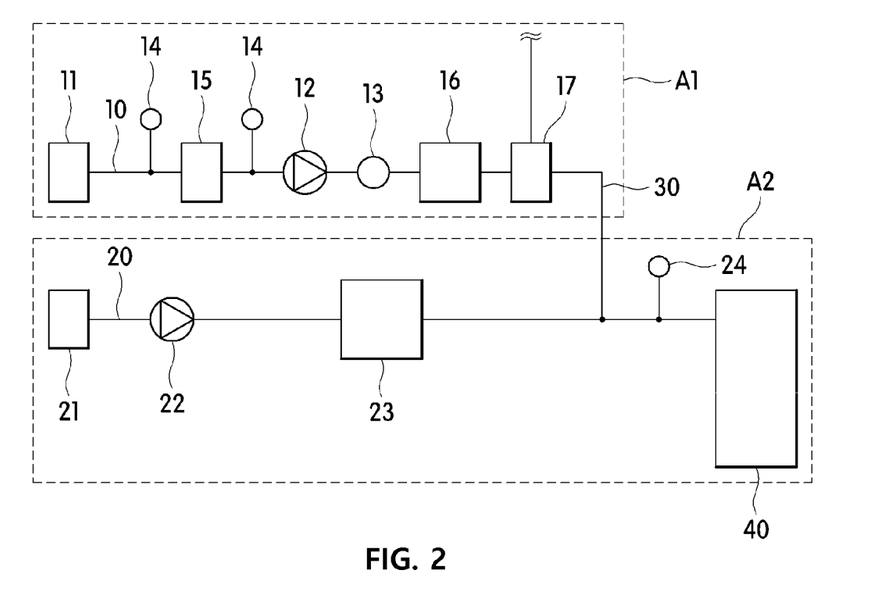
FIG. 2 is a schematic view illustrating a configuration of the ballast water treatment system of FIG. 1 used when ballast water is introduced into a ballast tank.
Figure 3:
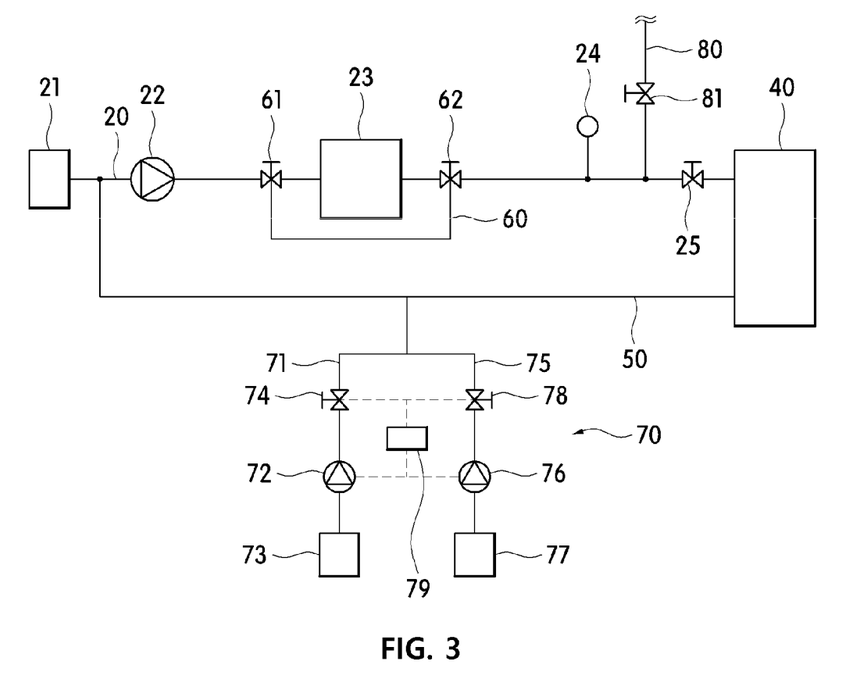
FIG. 3 is a schematic view illustrating a configuration of the ballast water treatment system of FIG. 1 used when ballast water is discharged from a ballast tank.

FIG. 1 is a schematic view illustrating a ballast water treatment system according to an embodiment of the present invention, FIG. 2 is a schematic view illustrating a configuration of the ballast water treatment system of FIG. 1 used when ballast water is introduced into a ballast tank, and FIG. 3 is a schematic view illustrating a configuration of the ballast water treatment system of FIG. 1 used when ballast water is discharged from a ballast tank.

Referring to FIGS. 1 to 3, a ballast water treatment system 1 includes a first ballast water supply pipe 10, a second ballast water supply pipe 20, a third ballast water supply pipe 30, a first sea chest 11, a first pump 12, a strainer 15, a pressure sensor 14, an electrolytic bath 16, a gas-liquid separator 17, a flow rate adjuster 13, a second sea chest 21, a second pump 22, a filter 23, a total residual oxidant (TRO) sensor 24, a ballast tank 40, a first ballast water discharge pipe 50, a bypass pipe 60, a reducing agent supply member 70, and a second ballast water discharge pipe 80.

The first ballast water supply pipe 10 receives ballast water from the first sea chest 11. The first ballast water supply pipe 10 may be positioned in a ship. The first ballast water supply pipe 10 supplies the ballast water to the third ballast water supply pipe 30 to be described below so as to supply the ballast water to the second ballast water supply pipe 20. A diameter of the first ballast water supply pipe 10 may be smaller than a diameter of the second ballast water supply pipe 20 to be described below. For example, the diameter of the first ballast water supply pipe 10 may be n times smaller than the diameter of the second ballast water supply pipe 20. Here, n may be one of positive integers greater than one. For example, n may be a positive integer in a range of 7 to 11.

The first sea chest 11 may introduce external ballast water into the ship. The first sea chest 11 supplies the ballast water to the first ballast water supply pipe 10. The first sea chest 11 may be provided on a side portion of a bow or a stern of the ship. The first sea chest 11 may be positioned in a non-explosion-proof area A2 in the ship. Here, the non-explosion-proof area A2 of the ship refers to an area which is not an explosion-proof area A1 of the ship. The explosion-proof area A1 of the ship refers to an area among internal areas of the ship in which an explosion may occur.

In the embodiment of the present invention, an example of the ship having the explosion-proof area A1 and the non-explosion-proof area A2 therein will be described. However, the present invention is not limited thereto, and the ballast water treatment system 10 of the present invention may be provided in a non-explosion-proof ship. In this case, both of the first sea chest 11 and the second sea chest 21 may be provided in the non-explosion-proof area.

The first sea chest 11, the strainer 16, the first pump 12, the flow rate adjuster 13, the electrolytic bath 16, and the gas-liquid separator 17 may be sequentially provided. The pressure sensor 14 may be provided at each of a front end portion and a rear end portion of the strainer 6.

The first pump 12 may supply the ballast water supplied from the first sea chest 11 to the electrolytic bath 16. The first pump 12 may be provided in the first ballast water supply pipe 10. A capacity of the first pump 12 may be smaller than a capacity of the second pump 22 to be described below. For example, the capacity of the first pump 12 may be in a range of 1% to 2% of the capacity of the second pump 2. Unlike the above-described example, the first pump 12 may be provided to have the capacity thereof the first pump 12 suitable to the diameter of the first ballast water supply pipe 10.

For example, the first pump 12 may be operated in a range of 1% to 2% of the capacity of the second pump 22 during operation. Alternatively, the first pump 12 may also be operated at 1% or less of the capacity of the second pump 22 during operation.

The strainer 15 may filter the ballast water flowing through the first ballast water supply pipe 10. The strainer 15 may filter large foreign matter contained in the ballast water. For example, the strainer 15 may be provided as a mesh-type wire mesh having a predetermined interval therein.

The strainer 15 may be provided in the first ballast water supply pipe 10. The strainer 15 may be provided at a front end portion of the first pump 12.

The pressure sensor 14 may measure the pressure of the ballast water. The plurality of pressure sensors 14 may be provided. For example, the pressure sensors 14 may be provided in front of and behind the strainer 15. The pressure sensors 14 may measure the pressure of the ballast water before the ballast water passes through the strainer 15 and the pressure of the ballast water after the ballast water passes through the strainer 15. The pressure sensors 14 may measure the pressure of the ballast water before the ballast water passes through the strainer 15 and the pressure of the ballast water after the ballast water passes through the strainer 15 so that a state in which the foreign matter inside the strainer 15 is filtered may be measured.

The strainer 15 may be provided to filter the foreign matter inside the introduced ballast water, thereby improving efficiency of an electrolysis process of the electrolytic bath 16 which will be described below.

In the above-described example, an example in which one strainer 15 is provided in the first ballast water supply pipe 10 is described. Alternatively, a plurality of strainers 15 may be provided.

For example, when two or more strainers 15 are provided, the strainers 15 may be provided to be connected in parallel. In this case, an opening and closing valve (not illustrated) may be provided at a front end portion of each of the strainers 15. In the case in which the plurality of strainers 15 are provided, another strainer 15 may be used when one strainer 15 is clogged with foreign matter.

As a result, a filtration function using the strainer 15 may be improved.

The electrolytic bath 16 may electrolyze the introduced ballast water. The electrolytic bath 16 may electrolyze the ballast water to generate a sterilization component. For example, the electrolytic bath 16 may generate a sterilization component such as sodium hypochlorite.

Thereafter, the sterilization component generated by the electrolytic bath 16 may be supplied to the second ballast water supply pipe 20 so that marine microorganisms inside the ballast water flowing through the second ballast water supply pipe 20 may be removed. For example, the marine microorganisms inside the ballast water flowing through the second ballast water supply pipe 20 may be removed using an oxidant, such as HOCl, OCl—, HOBr, OBr—, $O_3$, or $H_2O$ formed on a surface of an electrode of the electrolytic bath 16.

The electrolytic bath 16 may be provided in the first ballast water supply pipe 10. The electrolytic bath 16 may be provided behind the strainer 15. A plurality of electrolytic baths 16 may be provided. The electrolytic bath 16 may have a plurality of electrodes. An interval between the electrodes of the electrolytic bath 16 may range from 2 mm to 5 mm.

The gas-liquid separator 17 may separate gas and liquid from the ballast water which has passed through the electrolytic bath 16. The gas-liquid separator 17 may be provided in the first ballast water supply pipe 10. The gas-liquid separator 17 may separate gas and liquid from the electrolyzed ballast water which is supplied from the electrolytic bath 16. The gas separated by the gas-liquid separator 17 may be transmitted to the outside through a separate pipe or moved to a separate container.

For example, the gas-liquid separator 17 may have a perforated plate having a plurality of holes. Due to the perforated plate, gas and liquid may be prevented from being simultaneously pushed upward. As a result, efficiency of separation of gas and liquid may be improved.

The flow rate adjuster 13 may adjust a flow rate of the ballast water flowing through the first ballast water supply pipe 10. The flow rate adjuster 13 may be provided at a rear end portion of the first pump 12. The flow rate adjuster 13 may adjust the flow rate of the ballast water flowing through the first ballast water supply pipe 10 so as to adjust an amount of the sterilization component generated by being electrolyzed in the electrolytic bath 16.

The second ballast water supply pipe 20 receives the ballast water from the second sea chest 21. The ballast water in the second ballast water supply pipe 20 may pass through the filter 23 and then be supplied to the ballast tank 40 to be described below. The diameter of the second ballast water supply pipe 20 may be greater than the diameter of the first ballast water supply pipe 10. For example, the diameter of the second ballast water supply pipe 20 may be n times greater than the diameter of the first ballast water supply pipe 10. Here, n may be one of positive integers greater than one. For example, n may be a positive integer in a range of 7 to 11.

The second sea chest 21 may introduce external ballast water into the ship. The second sea chest 21 supplies the ballast water to the second ballast water supply pipe 20. The second sea chest 21 may be provided at the side portion of the bow or the stern of the ship. The second sea chest 21 may be positioned in the explosion-proof area A1 in the ship. Here, the explosion-proof area A1 of the ship refers to an area among the internal areas of the ship, in which an explosion may occur.

The second pump 22 may supply the ballast water supplied from the second sea chest 21 to the electrolytic bath 16. The second pump 22 may be provided in the second ballast water supply pipe 20. The capacity of the second pump 22 may be greater than the capacity of the first pump 12. The second pump 22 may be provided to have the capacity thereof suitable to the diameter of the second ballast water supply pipe 20.

The filter 23 may filter the ballast water passing through the second ballast water supply pipe 20. The filter 23 may receive the ballast water and filter foreign matter inside the ballast water. For example, the filter 23 may have a housing of the filter 23 and may have a ballast water inlet pipe and a ballast water outlet pipe into which the ballast water is introduced.

A filter 23 unit may be provided in the housing of the filter 23. For example, the filter 23 unit includes a protection net, an inner net, and a perforated net to filter the foreign matter in the introduced ballast water.

For example, a back-washing unit having a back-washing nozzle for cleaning an inner side of the filter 23 may be provided inside the filter 23.

The TRO sensor 24 may measure a concentration of an oxidant of the introduced ballast water or a concentration of an oxidant of the ballast water discharged from the ballast tank 40. The TRO sensor 24 may be provided in the second ballast water supply pipe 20. The TRO sensor 24 may be provided in the second ballast water supply pipe 20 adjacent to the ballast tank 40. The TRO sensor 24 may be provided between a point P of the second ballast water supply pipe 20, which is connected to the third ballast water supply pipe 30, and the ballast tank 40.

For example, one TRO sensor 24 may be provided. When one TRO sensor 24 is provided, the TRO sensor 24 may measure a concentration of an oxidant of the ballast water introduced into the ballast tank 40 or a concentration of an oxidant of the ballast water discharged from the ballast tank 40.

In the embodiment of the present invention, the ballast water may flow into a portion of the second ballast water supply pipe 20 when the ballast water is introduced into the ballast tank 40. In addition, when the ballast water is discharged from the ballast tank 40, the ballast tank 40 may be connected to the second ballast water discharge pipe 80 so that the ballast water may flow. That is, the portion of the second ballast water supply pipe 20 is a common pipe C through which the ballast water introduced into the ballast tank 40 flows or the discharged ballast water flows. By providing one TRO sensor 24 in the common pipe C, the TRO sensor 24 may measure both of the concentration of the oxidant of the ballast water introduced into the ballast tank 40 and the concentration of the oxidant of the ballast water discharged from the ballast tank 40. As a result, a plurality of TRO sensors 24 may not be provided, thereby reducing costs thereof. In addition, by providing one TRO sensor 24 in the common pipe C, the concentration of the oxidant of the ballast water may be efficiently measured.

A supply valve 25 may be provided in the second ballast water supply pipe 20. The supply valve 25 may open when the ballast water is introduced into the ballast tank 40. Alternatively, the supply valve 25 may be provided in a state in which the ballast tank 40 has the ballast water or may be provided in a closed state when the ballast water is discharged from the ballast tank 40.

The third ballast water supply pipe 30 may be connected to the first ballast water supply pipe 10 to supply the ballast water to the second ballast water supply pipe 20. One end portion of the third ballast water supply pipe 30 may be connected to the first ballast water supply pipe 10, and the other end portion of the third ballast water supply pipe 30 may be connected to the second ballast water supply pipe 20.

The ballast water which is electrolyzed in the electrolytic bath 16 may be supplied to the third ballast water supply pipe 30. The ballast water supplied to the third ballast water supply pipe 30 may be a liquid separated by the gas-liquid separator 17.

The third ballast water supply pipe 30 may supply the liquid, which is electrolyzed and has a sterilizing agent, to the ballast water passing through the filter 23 to be described below.

The ballast tank 40 may have an internal empty space. The internal space may be a space in which the ballast water is accommodated. For example, the ballast water may be seawater, brackish water, or fresh water. The ballast tank 40 may be positioned in the ship. For example, a plurality of ballast tanks 40 may be provided in the ship.

The first ballast water discharge pipe 50 may be connected to the ballast tank 40 to discharge the ballast water in the ballast tank 40 to the outside during deballasting. One end portion of the first ballast water discharge pipe 50 may be connected to the ballast tank 40, and the other end portion of the first ballast water discharge pipe 50 may be connected to a rear end portion of the second pump 22 of the second ballast water supply pipe 20.

Alternatively, one end portion of the first ballast water discharge pipe 50 may be connected to the ballast tank 40, and the other end portion of the first ballast water discharge pipe 50 may be connected to a front end portion of the second pump 22 of the second ballast water supply pipe 20.

The bypass pipe 60 is a pipe through which the ballast water supplied from the first ballast water discharge pipe 50 moves. The bypass pipe 60 may be branched from the second ballast water supply pipe 20. For example, the bypass pipe 60 may be branched from a front end portion of the filter 23 of the second ballast water supply pipe 20. The bypass pipe 60 may be connected to a rear end portion of the filter 23.

That is, the bypass pipe 60 is a pipe through which the ballast water supplied from the first ballast water discharge pipe 50 flows without passing through the filter 23. A first branch valve 61 and a second branch valve 62 may be provided in the bypass pipe 60.

The first branch valve 61 may be provided at a point at which the bypass pipe 60 is connected to the second ballast water supply pipe 20. For example, the first branch valve 61 may be provided at the front end portion of the filter 23. For example, the first branch valve 61 may be provided as a three-way valve. The first branch valve 61 may adjust the ballast water so that the ballast water does not flow through the bypass pipe 60 when the ballast water is supplied from the second ballast water supply pipe 20 to the ballast tank 40. Alternatively, the first branch valve 61 may adjust the ballast water so that the ballast water flows through the bypass pipe 60 without flowing into the filter 23 when the ballast water is discharged from the ballast tank 40.

The second branch valve 62 may be provided at a point at which the bypass pipe 60 is connected to the second ballast water supply pipe 20. For example, the second branch valve 62 may be provided at the rear end portion of the filter 23. For example, the first branch valve 61 may be provided as a three-way valve. The first branch valve 61 may adjust the ballast water so that the ballast water does not flow through the bypass pipe 60 when the ballast water is supplied from the second ballast water supply pipe 20 to the ballast tank 40. Alternatively, the first branch valve 61 may adjust the ballast water so that the ballast water flows through the bypass pipe 60 without flowing into the filter 23 when the ballast water is discharged from the ballast tank 40.

The reducing agent supply member 70 may supply a reducing agent to the ballast water which is discharged from the ballast tank 40. Some oxidants may be included in the ballast water in the ballast tank 40. When the ballast water is discharged to the outside, the ballast water may be neutralized and discharged. To this end, the reducing agent supply member 70 may supply the reducing agent to the ballast water.

The reducing agent supply member 70 may be connected to the first ballast water discharge pipe 50. The reducing agent supply member 70 may supply the reducing agent on the basis of the concentration of the oxidant of the ballast water introduced into the ballast tank 40 through the second ballast water supply pipe 20. For example, the reducing agent supply member 70 may supply the reducing agent to the ballast water flowing through the first ballast water discharge pipe 50 on the basis of the concentration of the oxidant which is measured by the TRO sensor 24.

The reducing agent supply member 70 includes a first reducing agent supply pipe 71, a first reducing agent pump 72, a first reducing agent supply unit 73, a first reducing agent valve 74, a second reducing agent supply pipe 75, a second reducing agent pump 76, a second reducing agent supply unit 77, a second reducing agent valve 78, and a controller 79.

The reducing agent supplied from the first reducing agent supply unit 73 may flow through the first reducing agent supply pipe 71.

The first reducing agent pump 72 may supply the reducing agent to the first reducing agent supply pipe 71. The first reducing agent pump 72 may be provided in the first reducing agent supply pipe 71.

The first reducing agent supply unit 73 may store a reducing agent of a preset concentration. The first reducing agent supply unit 73 may supply the reducing agent to the first reducing agent supply pipe 71. The first reducing agent supply unit 73 may be connected to the first reducing agent supply pipe 71.

The first reducing agent valve 74 may be provided in the first reducing agent supply pipe 71. The first reducing agent valve 74 may adjust a flow rate of the reducing agent flowing through the first reducing agent supply pipe 71.

The reducing agent supplied from the second reducing agent supply unit 77 may flow through the second reducing agent supply pipe 75.

The second reducing agent pump 76 may supply the reducing agent to the second reducing agent supply pipe 75. The second reducing agent pump 76 may be provided in the second reducing agent supply pipe 75.

The second reducing agent supply unit 77 may store a reducing agent of a preset second concentration. The reducing agent stored in the second reducing agent supply unit 77 may have a concentration different from that of the reducing agent stored in the first reducing agent supply unit 73. For example, the first reducing agent supply unit 73 may store a reducing agent having a concentration higher than that of the second reducing agent supply unit 77, for example, a reducing agent having a 50% concentration. Alternatively, the first reducing agent supply unit 73 may store a reducing agent having a concentration lower than that of the second reducing agent supply unit 77, for example, a reducing agent having a 25% concentration.

For example, the reducing agent may be provided as an aqueous solution of sodium thiosulfate ($Na_2S_2O_3$). Alternatively, any reducing agent may be applicable without limitation as long as it can neutralize the ballast water.

The second reducing agent supply unit 77 may supply the reducing agent to the second reducing agent supply pipe 75. The second reducing agent supply unit 77 may be connected to the second reducing agent supply pipe 75.

The second reducing agent valve 78 may be provided in the second reducing agent supply pipe 75. The second reducing agent valve 78 may adjust a flow rate of the reducing agent flowing through the second reducing agent supply pipe 75.

The controller 79 may control the first reducing agent pump 72, the first reducing agent valve 74, the second reducing agent pump 76, and the second reducing agent valve 78, which are described above, mix reducing agents of different concentrations, and supply the mixed reducing agents to the first ballast water discharge pipe 50.

For example, the controller 79 may supply the reducing agent to the first ballast water discharge pipe 50 on the basis of the concentration of the oxidant of the ballast water which is measured by the TRO sensor 24. In this case, when the controller 79 supplies the reducing agent, the controller 79 may supply the reducing agent at the same flow rate to the first ballast water discharge pipe 50 and supply the reducing agent at a different concentration.

According to an embodiment of the present invention, reducing agents having two different concentrations may be supplied at the same flow rate according to the concentration of the oxidant of the ballast water so that the discharged ballast water may be neutralized.

The second ballast water discharge pipe 80 may discharge the ballast water, which is transmitted through the first ballast water discharge pipe 50 and the bypass pipe 60, to the outside. The second ballast water discharge pipe 80 may be connected to the second ballast water supply pipe 20. For example, the second ballast water discharge pipe 80 may be connected to a rear end portion of the point P of the second ballast water supply pipe 20 which is connected to the third ballast water supply pipe 30.

A discharge valve 81 may be connected to the second ballast water discharge pipe 80. The discharge valve 81 may adjust a flow rate of the ballast water flowing through the second ballast water discharge pipe 80. For example, the discharge valve 81 may be provided as an on-off valve.

Hereinafter, a ballast water treatment method according to an embodiment of the present invention will be described.

Figure 4:
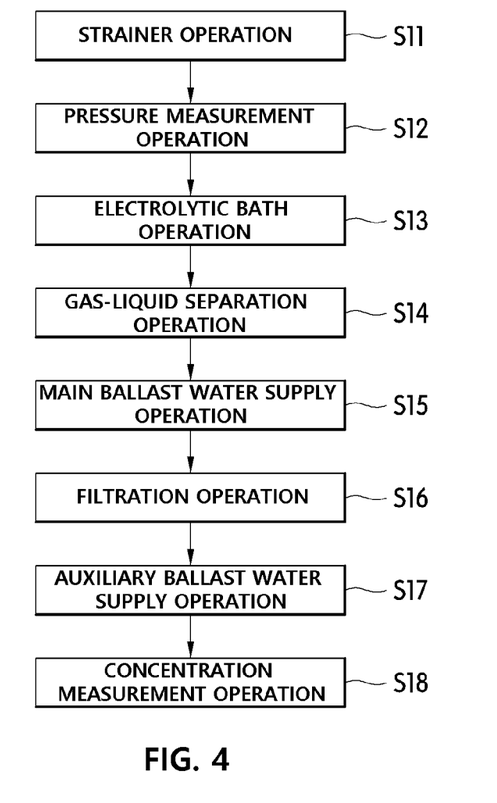
FIGS. 4 and 5 are flowcharts illustrating a ballast water treatment method according to an embodiment of the present invention.
Figure 5:
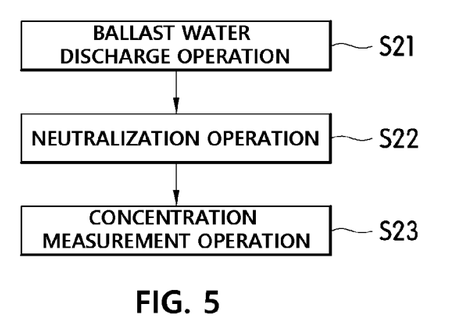
Figure 6:
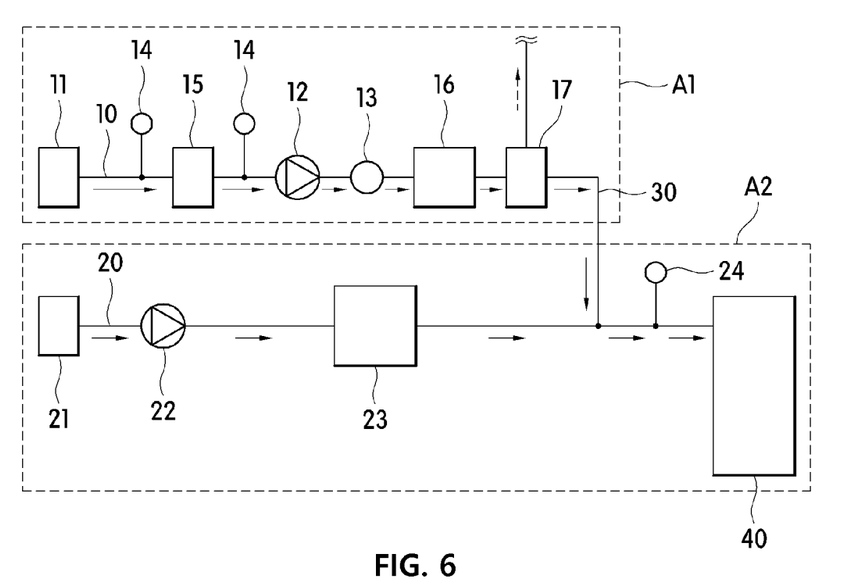
FIG. 6 is a schematic view illustrating a process of introducing ballast water into a ballast tank using the ballast water treatment system of FIG. 1.
Figure 7:
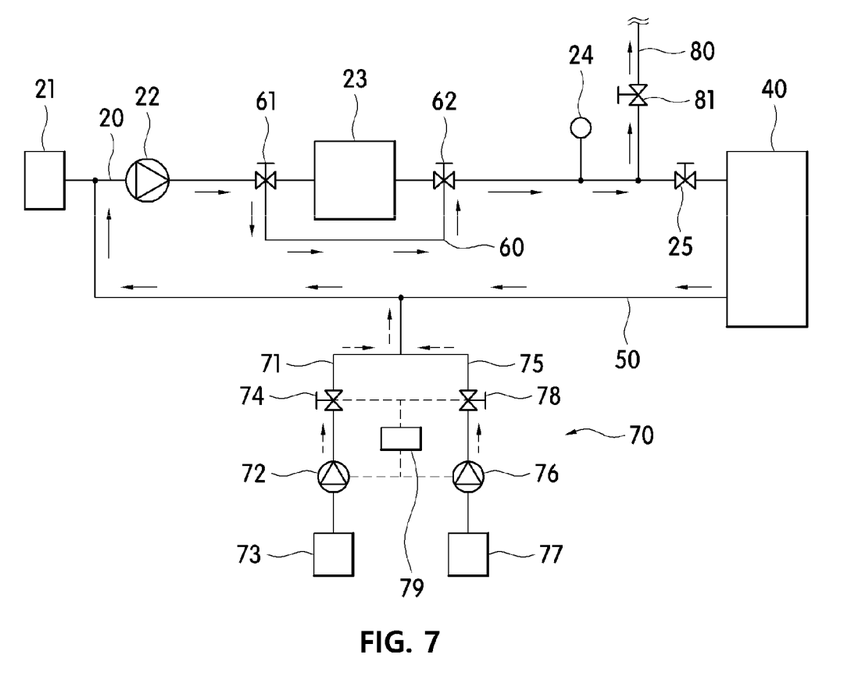
FIG. 7 is a schematic view illustrating a process of discharging ballast water from a ballast tank using the ballast water treatment system of FIG. 1.

FIGS. 4 and 5 are flowcharts illustrating a ballast water treatment method according to an embodiment of the present invention, FIG. 6 is a schematic view illustrating a process of introducing ballast water into a ballast tank using the ballast water treatment system of FIG. 1, and FIG. 7 is a schematic view illustrating a process of discharging ballast water from a ballast tank using the ballast water treatment system of FIG. 1.

Referring to FIGS. 4 to 7, the ballast water treatment method includes a method of treating ballast water when the ballast water is introduced into the ballast tank 40 and a method of treating ballast water when the ballast water in the ballast tank 40 is discharged to the outside.

Hereinafter, the method of treating the ballast water when the ballast water is introduced into the ballast tank 40 will be described.

When the ballast water is introduced into the ballast tank 40, the ballast water may be introduced from the first sea chest 11 and the second sea chest 21 into the first ballast water supply pipe 10 and the second ballast water supply pipe 20, respectively. The ballast water introduced into the first ballast water supply pipe 10 is subjected to a strainer operation S11.

The strainer operation S11 is an operation in which the ballast water passes through the strainer 15 before the ballast water is introduced from the first sea chest 11 into the electrolytic bath 16. The ballast water may pass through the strainer 15 so that foreign matter in the ballast water may be filtered.

The ballast water which moves in the first ballast water supply pipe 10 is subjected to a pressure measurement operation S12.

The pressure measurement operation S12 is an operation of measuring pressure at each of the front end portion and the rear end portion of the strainer 15 when the ballast water passes through the strainer 15. The pressure is measured by the pressure sensors 14 provided at the front end portion and the rear end portion of the strainer 15 of the first ballast water supply pipe 10.

The ballast water passing through the strainer 15 is introduced into the electrolytic bath 16 and subjected to an electrolytic bath operation S13.

The electrolytic bath operation S13 is an operation in which the ballast water introduced into the electrolytic bath 16 is electrolyzed. The electrolytic bath 16 may electrolyze the ballast water to generate an oxidant. For example, the electrolytic bath 16 may electrolyze the ballast water to generate an oxidant such as sodium hypochlorite.

The ballast water, which is subjected to the electrolytic bath operation S13, passes through the gas-liquid separator 17 and is subjected to a gas-liquid separation operation S14.

The gas-liquid separation operation S14 is an operation of separating the gas generated in the process in which the ballast water is electrolyzed. In the gas-liquid separation operation S14, the ballast water passing through the electrolytic bath 16 may be introduced into the gas-liquid separator 17. The ballast water introduced into the gas-liquid separator 17 may be separated into gas and liquid. The separated gas may be discharged to the outside through a separate pipe or stored in a separate container. The separated liquid may be supplied through the third ballast water supply pipe 30. Thereafter, the ballast water may be introduced into the second ballast water supply pipe 20.

The ballast water introduced into the second sea chest 21 is subjected to a main ballast water supply operation S15 in which the ballast water is supplied to the second ballast water supply pipe 20.

In the main ballast water supply operation S15, most of the ballast water introduced into the ballast tank 40 may be supplied. That is, an amount of the ballast water introduced from the second ballast water supply pipe 20 may be greater than an amount of the ballast water introduced from the first ballast water supply pipe 10.

In a filtration operation S16, the ballast water flowing through the second ballast water supply pipe 20 may be filtered. For example, the ballast water may pass through the filter 23 provided in the second ballast water supply pipe 20 and may be filtered. The filter 23 may filter foreign matter contained in the ballast water.

Thereafter, the ballast water is subjected to an auxiliary ballast water supply operation S17.

The auxiliary ballast water supply operation S17 is an operation of supplying the ballast water, which is electrolyzed in the electrolytic bath 16, to the ballast water which has passed through the filter 23. The electrolyzed ballast water contains an oxidant. The ballast water containing the oxidant may be supplied to the ballast water which has passed through the filter 23 to sterilize marine microorganisms inside the ballast water.

The second ballast water supply pipe 20 may receive the ballast water from the electrolytic bath 16 and then supply the ballast water to the ballast tank 40.

Before the ballast water is introduced into the ballast tank 40, the ballast water is subjected to a concentration measurement operation S18 in which a concentration of an oxidant is measured.

In the concentration measurement operation S18, the concentration of the oxidant may be measured by the TRO sensor 24 provided in the second ballast water supply pipe 20.

Hereinafter, the method of treating the ballast water when the ballast water is discharged from the ballast tank 40 will be described.

When the ballast water is discharged from the ballast tank 40, the ballast water in the ballast tank 40 is subjected to a ballast water discharge operation S21 in which the ballast water is discharged through the first ballast water discharge pipe 50.

In the ballast water discharge operation S21, the ballast water may be discharged through the first ballast water discharge pipe 50, the bypass pipe 60, the second ballast water supply pipe 20, and the second ballast water discharge pipe 80. In each of the above pipes, a flow rate of the ballast water flowing through a valve or a flow regulating member (not illustrated) may be adjusted.

The discharged ballast water is subjected to a neutralization operation S22.

In the neutralization operation S22, a reducing agent may be supplied to the first ballast water discharge pipe 50. The reducing agent may be supplied through the reducing agent supply member 70. For example, the reducing agent supply member 70 may supply an appropriate amount of reducing agent formed by mixing reducing agents having different concentrations on the basis of the concentration of the oxidant measured in the TRO sensor 24.

The ballast water, which has passed through the first ballast water discharge pipe 50 and the bypass pipe 60, is subjected to the concentration measurement operation S18 in the second ballast water supply pipe 20.

In the concentration measurement operation S23, a concentration of an oxidant of the discharged ballast water may be measured. For example, in the concentration measurement operation S23, the concentration of the oxidant of the ballast water may be measured using the TRO sensor 24 provided in the second ballast water supply pipe 20.

As described above, according to the embodiment of the present invention, when ballast water is introduced into a ship, marine microorganisms in the ballast water can be sterilized, and thus environmental pollution of a loading port due to the ballast water can be minimized.

In addition, according to the embodiment of the present invention, when ballast water in a ballast tank 40 of a ship is discharged to the outside, the ballast water can be discharged to the outside after neutralizing an oxidant inside the ballast water, and thus environmental pollution of a loading port can be minimized.

In addition, according to the embodiment of the present invention, an electrolytic bath that performs electrolysis can be provided in a non-explosion-proof area, and thus a risk of explosion can be minimized.

In addition, according to the embodiment of the present invention, an electrolytic bath, which is an electrical and electronic device, can be provided in a non-explosion-proof area, non-explosion-proof products can be used, and thus installation costs of the electrolytic bath can be minimized.

The above-described descriptions are only for the exemplary embodiments of the invention. In addition, the above-described contents show the exemplary embodiments of the present invention, and the present invention may be used in various combinations, modifications, and environments. That is, the embodiments disclosed herein may be changed or modified within the scope of the concept of the invention, the scope equivalent to the disclosed contents, and/or the skill or knowledge in the art. The above-described embodiments illustrate the best state for implementing the technical scope of the present invention, and various modifications required in the specific application field and use of the present invention are possible. Therefore, the detailed descriptions of the invention are not intended to limit the invention to the disclosed embodiments. In addition, the appended claims should be construed to include other embodiments.

What is claimed is:

1. A ballast water treatment system comprising:
a first ballast water supply pipe configured to receive ballast water from a first sea chest positioned in a first area of a ship;
an electrolytic bath configured to electrolyze the ballast water supplied from the first ballast water supply pipe;
a second ballast water supply pipe configured to receive ballast water from a second sea chest positioned in a second area of the ship located apart from the first area and supply the ballast water to a ballast tank of the ship;
a third ballast water supply pipe connected to the second ballast water supply pipe and the electrolytic bath so as to supply the ballast water, which has been electrolyzed by the electrolytic bath, to the ballast water which has passed through the second ballast water supply pipe;
a first pump provided in the first ballast water supply pipe to supply the ballast water to the electrolytic bath;
a second pump provided in the second ballast water supply pipe to supply the ballast water to the ballast tank;
a total residual oxidant (TRO) sensor provided between a point of the second ballast water supply pipe, which is connected to the third ballast water supply pipe, and the ballast tank to measure a concentration of an oxidant of the ballast water;
a first ballast water discharge pipe connected to the ballast tank, wherein one end portion of the first ballast water discharge pipe is connected to the ballast tank in order to discharge the ballast water in the ballast tank to the outside during deballasting and the other end portion of the first ballast water discharge pipe is connected to a front end portion of the second pump of the second ballast water supply pipe; and
a second ballast water discharge pipe disposed between a rear end portion of the TRO sensor of the second ballast water supply pipe and the ballast tank so as to discharge the ballast water, which is supplied from the second ballast water supply pipe, to the outside,
wherein the ballast water in the ballast tank flows in the order of the first ballast water discharge pipe, the second ballast water supply pipe and the second ballast water discharge pipe and then is discharged to the outside, during deballasting.

2. The ballast water treatment system of claim 1, further comprising a strainer provided in the first ballast water supply pipe to filter the ballast water flowing through the first ballast water supply pipe.

3. The ballast water treatment system of claim 2, further comprising pressure sensors provided in front of and behind the strainer.

4. The ballast water treatment system of claim 2, wherein an interval between electrodes of the electrolytic bath ranges from 2 mm to 5 mm.

5. The ballast water treatment system of claim 1, further comprising a bypass pipe through which the ballast water supplied from the first ballast water discharge pipe moves and which is branched at a rear end portion of the second pump of the second ballast water supply pipe to be connected to a front end portion of the TRO sensor of the second ballast water supply pipe,
wherein the ballast water in the ballast tank flows in the order of the first ballast water discharge pipe, the front end portion of the second pump of the second ballast water supply pipe, the bypass pipe and the second ballast water discharge pipe and then is discharged to the outside, during deballasting.

6. The ballast water treatment system of claim 1, further comprising a flow rate adjuster provided downstream of the first pump of the first ballast water supply pipe.

7. The ballast water treatment system of claim 1, wherein a diameter of the first ballast water supply pipe is smaller than a diameter of the second ballast water supply pipe.

8. The ballast water treatment system of claim 1, wherein a capacity of the first pump is smaller than a capacity of the second pump.

9. The ballast water treatment system of claim 1, further comprising a reducing agent supply member configured to supply a reducing agent to a first ballast water discharge pipe, wherein the reducing agent supply member mixes reducing agents having different concentrations and the mixed reducing agent is supplied to the first ballast water discharge pipe.

10. The ballast water treatment system of claim 9, wherein the reducing agent supply member includes:
a first reducing agent supply pipe;
a first reducing agent supply unit connected to the first reducing agent supply pipe for storing a reducing agent of a preset concentration;
a first reducing agent pump provided in the first reducing agent supply pipe to supply the reducing agent to the first reducing agent supply pipe;
a first reducing agent valve provided in the first reducing agent supply pipe to adjust a flow rate of the reducing agent flowing through the first reducing agent supply pipe;
a second reducing agent supply pipe connected to the first reducing agent supply pipe;
a second reducing agent supply unit connected to the second reducing agent supply pipe for storing a reducing agent of a preset second concentration;
a second reducing agent pump provided in the second reducing agent supply pipe to supply the reducing agent to the second reducing agent supply pipe;
a second reducing agent valve provided in the second reducing agent supply pipe to adjust a flow rate of the reducing agent flowing through the second reducing agent supply pipe; and
a controller for controlling the first reducing agent pump, the first reducing agent valve, the second reducing agent pump, and the second reducing agent valve.

11. A ballast water treatment method using the ballast water treatment system according to claim 1 comprising:
an electrolytic bath operation of receiving ballast water from a first sea chest of a ship and supplying the ballast water to an electrolytic bath through a first ballast water supply pipe;
a main ballast water supply operation of receiving ballast water from a second sea chest of the ship and supplying the ballast water to a ballast tank of the ship through a second ballast water supply pipe; and
an auxiliary ballast water supply operation of supplying the ballast water, which is electrolyzed by the electrolytic bath, to the ballast water which has passed through the second ballast water supply pipe.

12. The ballast water treatment method of claim 11, further comprising a strainer operation of passing the ballast water through a strainer before the ballast water is introduced into the electrolytic bath from the first sea chest.

13. The ballast water treatment method of claim 12, further comprising a pressure measurement operation of measuring pressure at each of a front end portion and a rear end portion of the strainer when the ballast water passes through the strainer.

14. The ballast water treatment method of claim 11, further comprising a gas-liquid separation operation of separating gas, which is generated by the electrolytic bath, using a gas-liquid separator.

15. The ballast water treatment method of claim 11, further comprising a neutralization operation of supplying a reducing agent to the ballast water discharged from the ballast tank to neutralize.

16. The ballast water treatment method of claim 15, further comprising a concentration measurement operation of measuring a concentration of an oxidant of the ballast water introduced into the ballast tank or measuring a concentration of an oxidant of the ballast water discharged from the ballast tank.

17. The ballast water treatment method of claim 11, wherein:
the first sea chest is positioned in a first area of the ship; and the second sea chest is positioned in a second area of the ship located apart from the first area.

* * * * *